A. H. NEULAND.
INDUCTION MACHINE.
APPLICATION FILED OCT. 2, 1913.
1,237,681.
Patented Aug. 21, 1917.
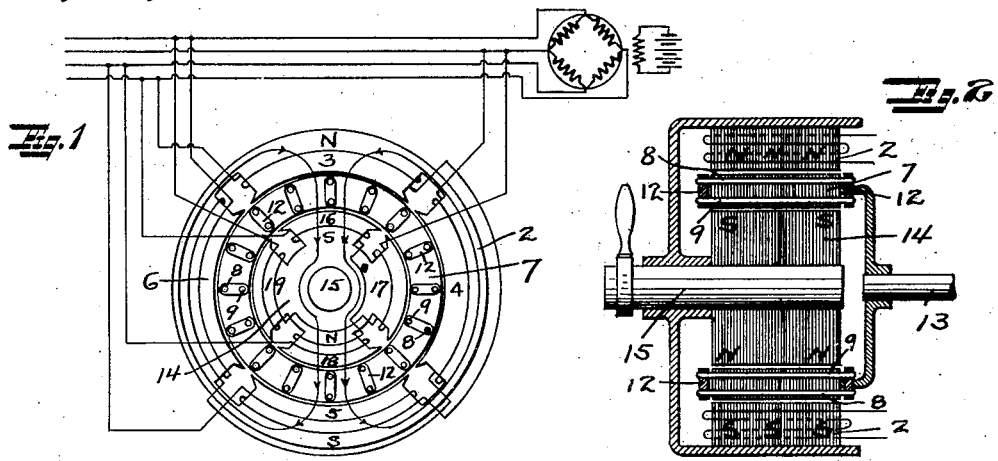
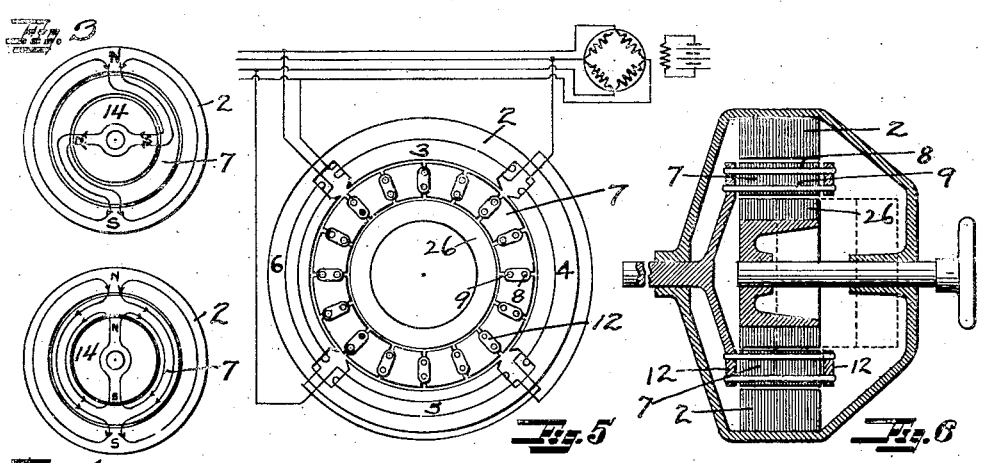
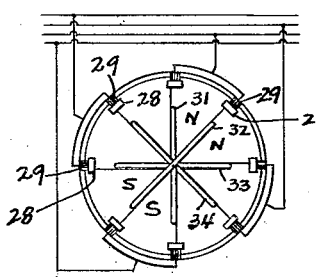 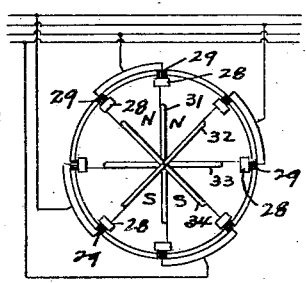 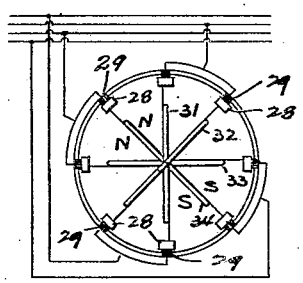
Witness
J. B. Gardner.
INVENTOR.
ALFONS H. NEULAND
By White & Prost
HIS ATTORNEYS

UNITED STATES PATENT OFFICE.

ALFONS H. NEULAND, OF SAN FRANCISCO, CALIFORNIA, ASSIGNOR TO NEULAND ELECTRICAL COMPANY, INC., A CORPORATION OF NEW YORK.

INDUCTION-MACHINE.

1,237,681. Specification of Letters Patent. Patented Aug. 21, 1917.

Application filed October 2, 1913. Serial No. 793,055.

*To all whom it may concern:*

Be it known that I, ALFONS H. NEULAND, a subject of the Czar of Russia, and a resident of the city and county of San Francisco, State of California, have invented certain new and useful Improvements in Induction-Machines, of which the following is a specification.

The invention relates to induction generators and motors.

The object of the invention is to provide a variable speed induction motor.

Another object of the invention is to provide an induction machine capable of operating at a variable speed and a variable torque as well as a simple means of starting a motor from rest.

Another object of the invention is to provide a method of varying the torque of an induction machine without varying the resistance of the secondary winding and without varying the primary windings.

The invention possesses other objects and advantageous features, which, with the foregoing, will be set forth at length in the following description where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description, as I may adopt many variations within the scope of my invention as set forth in said claims.

One of the features of the invention is the production in an induction machine, of a variable speed and torque by changing the relation to each other of two revolving magnetic fields which act upon a mutual secondary winding. By varying the relation of the fields to each other, the path of the flux through the secondary winding is varied, thereby producing a variation in the speed and torque of the machine. For the purpose of convenience, I shall describe the invention as applied to an induction motor, it being evident that the machine will also work as an induction generator if operated in connection with synchronous generators, or if excited by any of the means known to the art.

As in all induction machines, the speed of the rotating field or fields is fixed by the frequency of the alternating current supply and the number of pole windings on the stator. The stator windings of the present machine may be the same as the stator windings of induction machines in general use, or of any type capable of producing a revolving field.

Referring to the drawings accompanying the application;

Figure 1 is an end view partly diagrammatic, of one form of the machine of my invention.

Fig. 2 is a longitudinal section of the machine shown in Fig. 1.

Fig. 3 is a diagram showing the path of the flux in the machine shown in Fig. 1 for a certain relative position of the two rotating fields.

Fig. 4 is a similar diagram showing the path of the flux for another relative position of the two fields.

Fig. 5 is a diagrammatic end view of a type having but a single revolving magnetic field.

Fig. 6 is a longitudinal section of the machine shown in Fig. 9, the dotted lines indicating different positions of the inner core.

Fig. 7 is a diagrammatic view of a modified form of means for moving one field relative to the other, by means of movable contacts.

Figs. 8 and 9 are similar views showing the contacts moved to other positions, to change the relative positions of the two rotating fields.

The machine illustrated in Figs. 1 and 2 is a two pole two phase machine, but it is evident that machines may be readily designed employing a different number of poles and it is to be understood that I do not limit myself to a two-phase machine. The present machine is a two pole arrangement with but a single slot per pole and phase. This arrangement has been chosen for the sake of simplicity in illustration and description, but a distributed winding may be equally well employed. The machine consists of a laminated stator 2 having four projections 3, 4, 5, 6, on which are arranged the windings producing the revolving field, one pair of opposite pole projections being encircled by the windings of one phase and the other pair of opposite pole projections being encircled by the windings of the second phase, so that a rotating field is produced.

Arranged concentrically with respect to the poles 3, 4, 5 and 6 is the rotor 7, formed of ring shaped laminations, in which are embedded or arranged the longitudinally extending bars 8—9. These bars are arranged in two circumferential series, the bars 8 lying in the outer series and the bars 9 lying in the inner series. The bars in each series are spaced regularly circumferentially, a bar in one series and a bar in the other series forming a pair. The bars project from the ends of the rotor and each pair of bars, that is, one in each series, are connected together at their ends by straps 12, thereby short circuiting each pair of bars. These bars and straps form the secondary winding of the machine. The rotor 7 is mounted upon a suitable rotatable shaft 13 from which power is taken off or applied.

Arranged concentrically with regard to the rotor 7 is a second core or stator 14 mounted on a shaft 15 so that the core 14 may be moved with respect to the stator 2. Any suitable means may be employed to vary the relative position of the inner and outer stators and hold them in such position. The inner stator is provided with the same number of pole projections 16—17—18—19 as the stator 2 and the pole projections are provided with windings connected to the alternating current supply to produce a revolving field, which has the same angular velocity as the field of the stator 2. With the two magnetic fields rotating at the same angular velocity it is evident that a pole of one polarity on stator 2 is always opposed by a pole of opposite polarity on stator 14 when the parts are in the position indicated in Fig. 1. The flux, therefore, passes from pole 3 radially through the rotor to pole 16, across the stator 14 to pole 18, radially through the rotor to pole 5 and completes the circuit back to pole 3 through the stator 2. The lines of force are, therefore, not cutting the short circuited secondary windings of the rotor formed by the bars 8—9, and, consequently, no electromotive force is induced in the bars, no force is exerted on the bars and the rotor therefore remains stationary.

The current which circulates in the primary winding 5, therefore, is of such magnitude as would be the case in an induction motor with an open secondary.

If, however, the stator 14 be rotated with respect to the stator 2, so that the oppositely magnetized poles are not directly opposed, the flux in passing from one stator to the other must pass through some of the closed circuits formed by the bars 8—9. In Fig. 3 I have shown the path of the flux when the stator 14 is moved 90 degrees with respect to the position shown in Fig. 1, bringing pole winding 16 opposite pole winding 4. In this position, the flux passes from pole 3, through rotor 7 for a quarter circle, thereby producing a current in the bars within that quarter circle, to pole 16, whence it passes to pole 18, through rotor 7 for a quarter circle to pole 5, and thence through stator 2 to pole 3, completing the magnetic circuit. In this position of the stator 14, one half of the rotor circuits are effective to exert a torque on the rotor. In Fig. 4, I have shown the path of the flux when the stator 14 has been moved to a position 180° removed from the position shown in Fig. 1 or in other words to a position in which the opposing poles of the two stators are of like sign. When in this position, the flux produced by the windings on stator 2 passes circumferentially in opposite directions through the rotor to the opposing pole of stator 2, and the flux produced by the windings on stator 14 passes circumferentially in opposite directions through the rotor to the opposing pole of stator 14, causing substantially all of the rotor circuits to be cut by the flux and inducing a current in said circuits.

Therefore, by shifting the position of stator 14 with respect to stator 2, the flux is made to traverse a lesser or greater number of the short circuited bars resulting in a variable torque.

In Figs. 5 and 6 I have shown an induction machine in which only one stator is employed. The stator 2 is similar to the stator shown in Fig. 1 and is wound in the same manner. The rotor 7 is identical with the rotor shown in Fig. 1. Arranged within the rotor is a laminated core 26 carrying no windings and capable of being moved longitudinally with respect to the stator. When the core 26 lies wholly within the stator, the flux passes from one pole of the stator directly across the rotor and core to the other pole of the stator of opposite sign without cutting the rotor bars. When the core is moved partly out of the stator, the resistance to the passage of the flux across the inner core increases, causing a portion of the flux to pass circumferentially through the rotor, inducing a current in the rotor winding and setting it in motion. When the core is entirely withdrawn from within the stator, the total flux passes circumferentially through the rotor, inducing a large current in the rotor bars and consequently producing a powerful torque.

In Figs. 7 to 9 inclusive I have shown a modified form of construction, in which the relative movement of the rotating fields is accomplished electrically instead of mechanically. The coils or windings 31—32—33—34 on the stator in which the relatively movable rotating field is produced are connected at their ends to contact bars 28 arranged preferably at some point remote from the machine. These contact bars are preferably arranged circumferentially and are adapted to be engaged by brushes 29 connected to the feed wires. These brushes are arranged on a suitable rotatable frame so that the brushes may be moved relative to the contacts, so that the phase relation of the coils with respect to the stator may be varied. In Fig. 7, coils 31 and 32 are connected to one phase and coils 33 and 34 to the second phase. In Fig. 8, the brushes have been moved in a counter-clockwise direction, through the angle between the successive contacts, causing coils 31 and 34 to be in one phase and coils 32 and 33 to be in the second phase, or causing a relative movement of the field in one stator with respect to the field in the other stator of 45°. In Fig. 9, the brushes have been moved another 45° in a counter-clockwise direction, placing coils 33 and 34 in one phase and coils 31 and 32 in the second phase, producing a relative movement of the field in one stator with respect to the field in the other stator.

I claim:

1. In an induction machine, a longitudinally stationary laminated rotor provided with a closed winding, means including fixed poles carrying polyphase windings for producing a substantially constant magnetic flux acting on said rotor and means for altering the path of said flux in said rotor, whereby the magnetic flux is diverted from said winding.

2. In an induction machine, a longitudinally stationary laminated rotor provided with a closed winding, means for producing a revolving magnetic flux acting on said winding, and means for diverting the magnetic flux from said winding, while maintaining the flux traversing said rotor substantially constant.

3. In an induction machine, a rotor comprising a laminated ring, a series of bars embedded in said ring at its outer circumference, a series of bars embedded in said ring at its inner circumference, a bar in one series and a bar in the other series forming a pair, conductors connecting both ends of each pair, means including two stationary elements for producing a magnetic flux acting on said pairs and means for circumferentially changing the relative positions of the fluxes in the stationary elements whereby the number of pairs of bars traversed by the magnetic flux is varied.

4. In an induction machine, a rotor comprising a laminated ring, a series of bars embedded in said ring at its outer circumference, a series of bars embedded in said ring at its inner circumference, both ends of the bars of the outer series being conductively connected to both ends of the bars of the inner series forming closed loops, means for producing a revolving magnetic flux traversing said closed loops, and means for diverting the flux from said closed loops.

5. In an induction machine, a stationary element provided with polyphase windings arranged to produce a revolving magnetic flux, a rotor carrying a secondary winding and means for varying the length of the path of said flux in the rotor whereby the number of closed turns of the secondary winding traversed by the said flux is varied.

6. In an induction machine, a stationary laminated element carrying a primary winding producing a rotating magnetic flux, a second stationary laminated element arranged within and concentric with said first stationary element producing a second rotating flux of equal angular velocity to that of the first flux, an annular laminated rotor arranged between said stationary elements and a closed secondary winding on said rotor acted on by the fluxes of the first and second stationary elements and means for changing the circumferential positions of the fluxes of the two stationary elements, thereby diverting the flux from the closed turns of the secondary winding.

7. In an induction machine, a stationary laminated element carrying a primary winding, a second laminated element arranged within and concentric with said first element and carrying a second primary winding, a laminated ring adapted to be rotated arranged between said laminated elements, a series of bars embedded in said ring adjacent its outer circumference, a series of bars embedded in said ring adjacent its inner circumference and means conductively connecting the ends of each bar in one series with the ends of an adjacent bar in the other series.

8. In an induction machine, a stator provided with a polyphase primary winding, a rotor arranged within said stator, a plurality of bars extending longitudinally of said rotor, said bars being arranged in pairs, straps connecting both ends of each pair to produce a plurality of closed circuits, a stator provided with a polyphase primary winding, arranged within said rotor, and means for varying the position of said second stator with regard to the first stator.

9. In an induction machine, a rotor comprising a laminated ring, a series of bars embedded in the ring at its outer circumference, a series of bars embedded in the ring at its inner circumference, a bar in one series and an adjacent bar in the other series forming a pair, and conductors connecting both ends of each pair.

10. In an induction machine, a stationary laminated element carrying a primary winding adapted to be fed by an alternating current to produce rotating magnetomotive forces, a second stationary laminated element arranged within and concentric with said first stationary element and carrying a primary winding adapted to be fed by an alternating current of the same frequency to produce rotating magnetomotive forces of the same angular velocity as those of the first stationary element, an annular laminated rotor arranged between said stationary element, a series of conductors embedded adjacent the outer circumference and a series of conductors embedded adjacent the inner circumference of said rotor, the conductors being connected at their ends forming a rotor winding composed of closed turns, the flux due to the magnetomotive forces of the first and second stationary elements acting on said rotor winding and means for changing the relation of the magnetomotive forces of the first stationary element to the magnetomotive forces of the second stationary element, thereby changing the flux force acting on said rotor winding.

11. In an induction machine, a laminated rotor provided with a closed winding, means for producing a magnetic flux traversing said rotor and said winding including two stationary elements, one of which is provided with a polyphase winding and means for changing the relation of one stationary element to the other whereby the magnetic flux is caused to traverse the rotor without traversing the closed turns of the rotor winding.

In testimony whereof, I have hereunto set my hand at San Francisco, California, this 26th day of September, 1913.

ALFONS H. NEULAND.

In presence of—
  H. G. PROST,
  P. S. PIDWELL.